June 26, 1951 A. M. THORNTON ET AL 2,558,018

WIDE AND NARROW BAND CARRIER CURRENT SYSTEM

Filed Sept. 6, 1947 2 Sheets-Sheet 1

Inventors
Alfred Marcus Thornton
Hector Thomas Prior
Stanley James Goulloe
By Robert Harding Jr.
Attorney June 26, 1951 A. M. THORNTON ET AL 2,558,018

WIDE AND NARROW BAND CARRIER CURRENT SYSTEM

Filed Sept. 6, 1947 2 Sheets-Sheet 2

Inventors
Alfred Marcus Thornton
Hector Thomas Pizor
Stanley James Goullee
By Robert Harding Jr.
Attorney Patented June 26, 1951 2,558,018

UNITED STATES PATENT OFFICE 2,558,018

WIDE AND NARROW BAND CARRIER CURRENT SYSTEM

Alfred Marcus Thornton, Hector Thomas Prior, and Stanley James Goullee, London, England, assignors to International Standard Electric Corporation, New York, N. Y.

Application September 6, 1947, Serial No. 772,532
In Great Britain November 29, 1946

5 Claims. (Cl. 179—15)

The present invention relates to multichannel electric carrier current communication systems, and concerns arrangements whereby two or more adjacent channels of the system may be conveniently substituted by another communication channel covering a wider frequency band than a normal channel.

In countries where the density of population is relatively small, and the principal centres are far apart, normal communication facilities are often provided by open-wire line circuits over which multichannel carrier current systems are operated. When it is desired to provide additional facilities, such as broadcasting circuits, it is often difficult to find line accommodation for such circuits. It may often be possible, however, to arrange so that broadcasting facilities are provided during relatively slack periods of normal communication, when channels can be temporarily put out of service.

It is the principal object of the present invention to provide a convenient arrangement for temporarily substituting a broadcasting channel, or other channel occupying a relatively wide frequency band, for several of the normal communication channels of a carrier system, which may be operated over cable, open wire, or radio link.

This object is achieved according to the invention by providing an arrangement in which the multichannel system and the broad band system are both simultaneously coupled to the line or other communication medium, and the broad band system is designed so that it employs a carrier wave of the same frequency as one of the normal channels which it is intended to replace. Means is provided for switching this carrier wave from the normal channel equipment to the broad band equipment, and also for disconnecting at the same time the carrier wave source from the equipment of all the other channels which the broadband system replaces. By this means all the channels replaced are deprived of carrier current supply, and are therefore incapable of being operated, and all risk of interference with the broad band system resulting from carrier leak is avoided.

By this means no additional carrier supply source has to be provided for the broad band system, and the switching operation is extremely simple, no switch contacts being required in any transmission circuits.

In order to make the invention quite clear, a carrier current system will be described having a particular number of channels, and employing particular carrier frequencies. It will be understood of course, that the invention may be embodied in carrier systems employing other arrangements of channels and frequencies.

The invention will be explained with reference to the accompanying drawings, in which—

The embodiment chosen to illustrate the invention includes a conventional twelve-channel carrier telephone system occupying a band from about 60 to 108 kilocycles per second (kc./s.), employing carrier frequencies of 64, 68, 72, etc. up to 108 kc./s. in steps of 4 kc./s., respectively, for the twelve channels. These channels will be referred to by the letters A to L respectively. Arrangements are provided for replacing channels D, E and F by one broadcasting channel about 10 kc./s. wide and channels G, H and I by another similar broadcasting channel. The first broadcasting channel employs a carrier frequency of 84 kc./s. (that of channel F) and the second one employs a carrier frequency of 96 kc./s. (that of channel I).

Figures 1, 2:
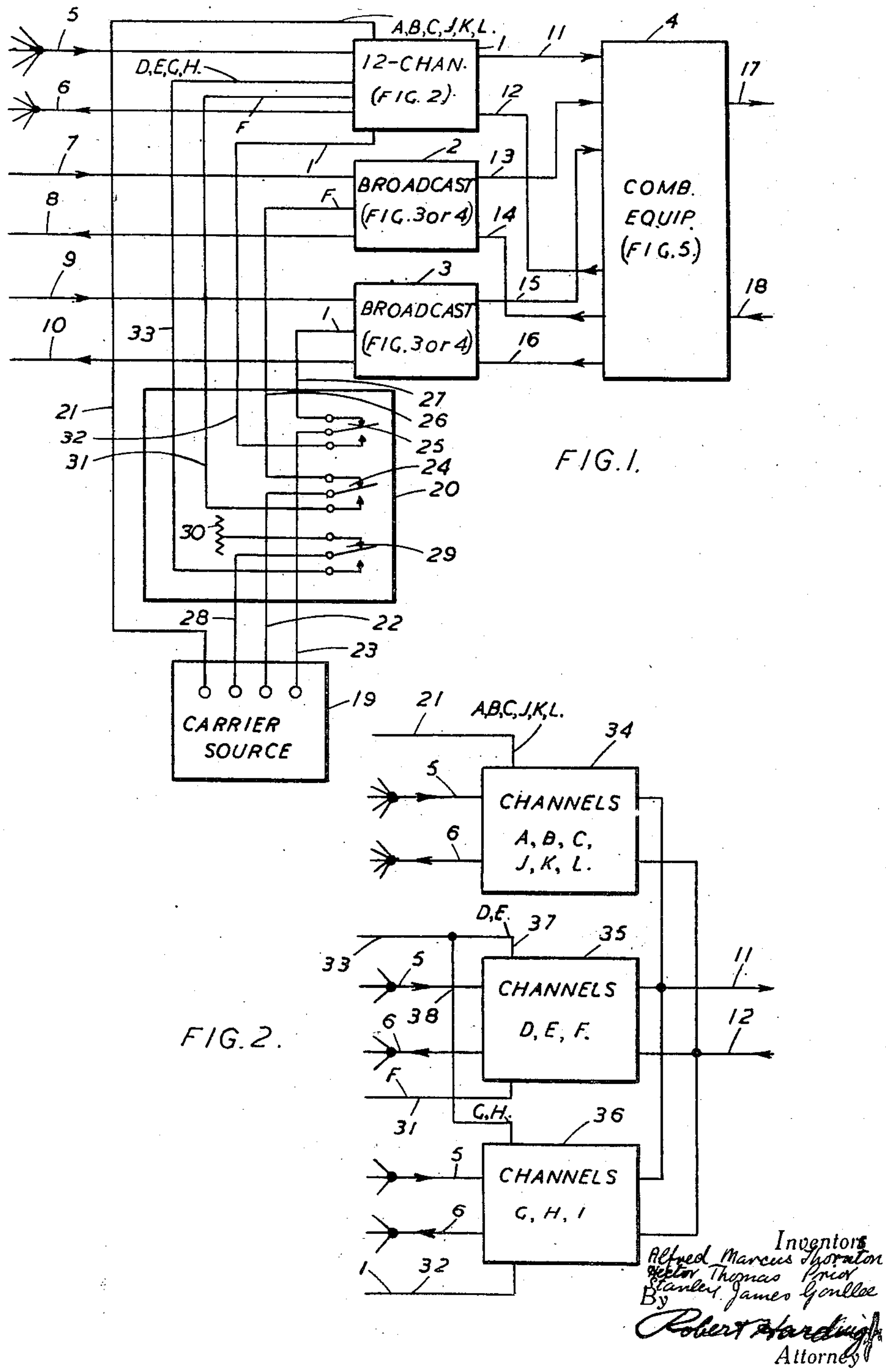
Fig. 1 shows a block schematic circuit diagram of an embodiment of the invention.
Fig. 2 shows in more detail the multi-channel equipment shown in Fig. 1.

Referring first to Fig. 1, block 1 represents the twelve channel terminal equipment, shown in more detail in Fig. 2. Blocks 2 and 3 represent the two broadcasting equipments represented in Fig. 3 or 4. Block 4 represents the combining equipment shown in Fig. 5. Conductors 5 and 6 respectively represent the send and receive local circuits of the twelve-channel equipment 1, and each is intended to represent diagrammatically the twelve corresponding local circuits which are not shown separately to avoid complicating the figure. The send and receive local circuits for the broadcasting equipments 2 and 3 are indicated by the conductors 7, 8 and 9, 10 respectively.

The sidebands corresponding to the twelve channels are supplied to the combining equipment 4 over conductor 11 and the incoming sidebands are received from the equipment 4 over conductor 12. The corresponding conductors for the two broadcasting equipments are 13, 14 and 15, 16. The outgoing and incoming lines connected to the combining equipment 4 are designated 17 and 18.

The normal carrier current supply source for the twelve channel system is shown at 19. This supplies the twelve carrier frequencies mentioned above, and associated therewith is a switching unit 20. The carrier course 19 supplies directly to the equipment 1 the six carrier waves A, B, C, J, K and L over separate conductors which are collectively represented by the conductor 21. These channels are not affected by the broadcast channels. The carrier source also supplies the carrier waves F and I respectively over conductors 22 and 23, switches 24 and 25 (in the position shown) in the unit 20, and conductors 26 and 27, to the broadcast equipments 2 and 3.

The conductor 28 of the carrier source 19 represents four separate conductors supplying the four carrier waves D, E, G, and H respectively to four corresponding switches collectively represented by the switch 29. In this position these carrier waves are supplied to four corresponding load resistances represented by 30. These are the carriers corresponding to the other channels which are replaced by the broadcasting systems, and the channel equipments corresponding to the six channels D, E, F, G, H, I, therefore receive no carrier wave supply and therefore cannot be operated.

When the three switches are changed over to the opposite position, it will be seen that carriers F and I will now be supplied to the equipment 1 over conductors 31 and 32, and D, E, G and H will be supplied over four separate conductors represented collectively by the conductor 33. The broadcast channels are now deprived of carrier supply and cannot be operated.

Referring to Fig. 2, block 34 represents the channel equipment for the channels A, B, C, J, K, and L and blocks 35 and 36 represent the equipment for channels D, E, F, and G, H, I, respectively which are those which can be replaced by the broadcast channels. These blocks are supposed to include the usual separating filters and impedance compensating networks which are not shown in detail. Conductor 21 is shown leading to block 34 and conductors 31 and 32 to blocks 35 and 36. Conductor 33 representing the four conductors bearing the carriers D, E, G and H, divides into 37, representing two conductors leading to block 35 bearing D and E; and 38 representing two conductors leading to block 36 and bearing G and H.

Referring again to Fig. 1, it is of course not essential that both broadcasting systems should be in service or both out of service. The switches 24 and 25 will normally be separately operable, and each should preferably be mechanically or electrically coupled to those switches represented by 29 which correspond to the channels which are replaced by the broadcasting system in question. It is also evident that one of the broadcasting systems could be omitted, in which case the corresponding channels D, E, F or G, H, I would be permanently in service and would be grouped with the other channels not affected by the broadcasting systems and represented by the block 34 (Fig. 2). Only one of the switches 24 or 25 would then be needed. Any group of three adjacent channels could evidently be replaced by a broadcasting system, provided that the appropriate carrier frequency be chosen for the broadcasting system. In the embodiment described, this will be the highest of the three carriers, but if upper sidebands instead of lower were used in the twelve channel system, the lowest carrier of the three would be chosen. It is also obvious that a third group of three channels such as A, B, C could be replaced by a third broadcasting system, by adding another switch similar to 24 or 25.

It is, of course, necessary that the switches at both ends of the line should be set in the same manner. It is evident that the two sets of switches may be co-ordinated by means of signals transmitted over one of the channels in any convenient way, as will be understood by those skilled in the art.

While in the embodiment which has been described the broadcasting system was arranged to replace three adjacent channels of the twelve channel system, it is evident that the broad band system could replace only two, or more than three adjacent channels, by applying the same principles in choosing the carrier frequencies and arranging the switching.

In some cases it may be desired that when, say two broadcasting systems are to be operated over the line, all channels of the multichannel system will be shut down for normal service, but two or three of them may be required for broadcasting service purposes. In such case advantage may be taken of the additional frequency space available to separate the broadcasting bands more widely, thereby gaining some advantage as to crosstalk, between the broadcasting channels. In such case the carrier frequencies I and E (96 and 80 kc./s.) for example, might be used for the broadcasting channels thus spacing them at least the width of one channel (4 kc./s.) apart. Then channels J, K and L, for example, would be available for the service circuits. However, it should be understood that when the broadcasting bands are separated in this way, all of the normal channels whose frequency bands are not overlapped by one of the broadcast bands may be simultaneously used, if desired.

Figure 3:
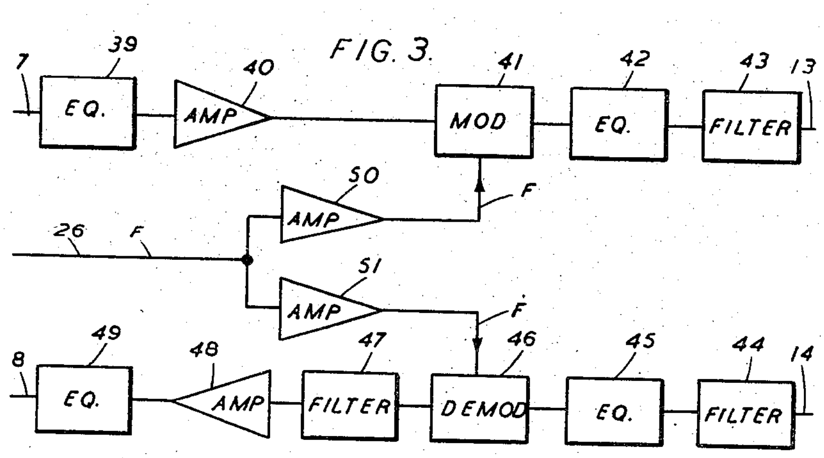
Fig. 3 shows details of the broadcasting equipment shown in Fig. 1.

Fig. 3 shows in block schematic form details of one suitable form of the broadcast equipment 2 of Fig. 1. The transmitting branch between the input local conductor 7 and the output line conductor 13 comprises an equaliser 39 for the incoming cable, followed by an amplifier 40 which leads to a modulator 41. The modulator is connected through an equaliser 42, for equalising the modulated output, and through a band filter 43 to the conductor 13. The receiving branch between the input line conductor 14 and the output local conductor 8 includes a band filter 44 leading through a line equaliser 45, a demodulator 46 similar to 41, and a low pass filter 47 to an amplifier 48, the output of which is connected through the audio frequency equaliser 49 to the local conductor 8.

According to the invention, the carrier frequency wave F is supplied over conductor 26 to the modulator 41 and also to demodulator 46, preferably through respective amplifiers 50 and 51.

Figures 4, 5:
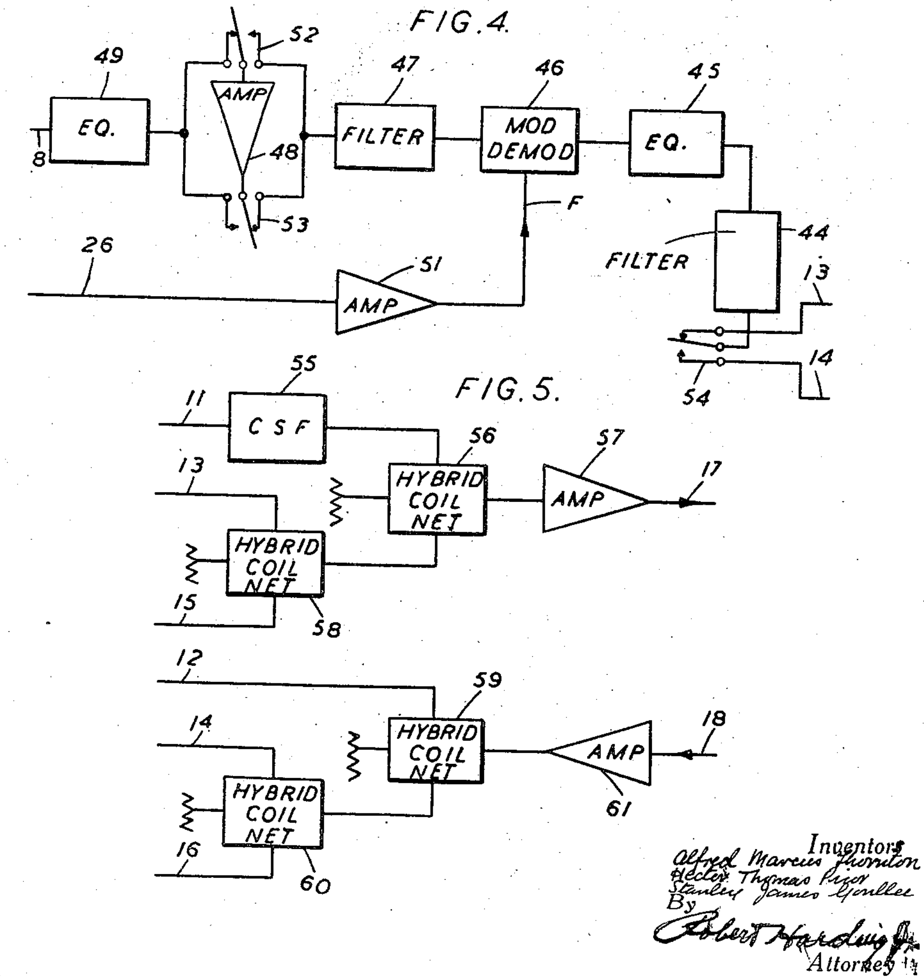
Fig. 4 shows simplified broacasting equipment.
Fig. 5 shows details of the combining equipment shown in Fig. 1.

A simplified reversible form of the broadcasting equipment is shown in Fig. 4. This is substantially the same as the receiving part of Fig. 3 with the addition of a pair of switches 52 and 53 used to reverse the amplifiers 48. A third switch 54 mechanically or electrically coupled to the other two switches enables the filter 44 to be connected either to the conductor 13 or to the conductor 14, according as the equipment is used for transmission or reception. The demodulator 46 acts also as a modulator when transmitting, which is the condition which holds with the switches in the position shown. When the switches are operated to the other position, the equipment will be arranged for receiving. It is clear that in this case only one local conductor 8 is required, and amplifier 50 is not needed.

The elements shown in Figs. 3 and 4 are all well known and their arrangement is conventional, and therefore it is unnecessary to give further details which will be clear to those skilled in the art. It will be understood that Fig. 3 or 4 can also be used for the broadcasting equipment 3 of Fig. 1, the only difference being that it will be designed to use the carrier frequency I instead of F.

An example of the combining equipment 4 of Fig. 1 is shown in block schematic form in Fig. 5. The transmit conductor 11 from the output of the twelve channel equipment 1 is passed through a carrier suppression filter 55 to one local branch of a hybrid coil network 56 of well known type. The line branch of this network is connected through an amplifier 57 to the outgoing conductor 17. The two transmit conductors 13 and 15 from the two broadcasting equipments 2 and 3 are connected to the two local branches of another hybrid coil network 58, the line branch of which is connected to the other local branch of the network 56. The receiving branch of the combining network comprises two similarly arranged hybrid coil networks 59 and 60, leading to the receive conductors 12, 14 and 16 of the three equipments, no unit corresponding to 55 being required in this case. The line conductor 18 is connected to the line branch of the hybrid coil network 59 through an amplifier 61.

By this arrangement, the three equipments are all simultaneously connected to the lines 17 and 18 in such a manner that the impedance of the filter system of any one equipment does not interfere with the operation of the filters of any other. The hybrid coil networks may be arranged to divide the power between the local branches either equally or in any desired ratio, according to the manner in which the circuit levels are to be proportioned. It is to be understood also that in this figure, as well as in Figs. 3 and 4, additional amplifiers and/or attenuating networks (not shown) may be introduced where necessary for adjusting the levels, or for any other purpose.

Referring again to Fig. 5, if only one broadcasting channel is to be provided, then the hybrid coil networks 58 and 60 are not required, and conductors 13 and 14 will be connected direct to the hybrid coil networks 56 and 59 respectively. If there should be three or more broadcasting channels, then additional hybrid coil networks (not shown) will be added and arranged according to the same plan as those already shown, as will be clear to those skilled in the art.

Referring to Fig. 3, when there is likely to be crosstalk between the two broadcast channels it may be desirable to introduce compandor equipment to reduce the effect of the crosstalk. This a contrast contactor (not shown) may, for example, be introduced between the elements 42 and 43, with a corresponding contrast expander (not shown) between elements 44 and 45. The contractor at the transmitting end and the expander at the receiving end should be complementary and should preferably together introduce a zero loss. In Fig. 4, switching means (not shown) coupled to the switches 52, 53 and 54 could be provided to insert an expander or a contractor (according as the equipment is set for receiving or transmitting), between the units 44 and 45.

What is claimed is:

1. An electric multichannel carrier current communication system in which the principal channels occupy a plurality of adjacent relatively narrow frequency bands, comprising narrow band terminal equipment for the said principal channels coupled to a transmission medium, broad band terminal equipment for at least one alternative channel occupying a different relatively wide frequency band which overlaps more than one of said adjacent relatively narrow frequency bands, the broad band terminal equipment being also coupled to the said transmission medium, a carrier frequency source connected to supply to the narrow band terminal equipment a plurality of carrier waves of different frequencies corresponding respectively to the said relatively narrow frequency bands, and a switching device operable to transfer the carrier wave corresponding to one of the bands overlapped by each of the relatively wide bands from the narrow band equipment to the broad band equipment, the said switching device including means when operated, to disconnect the carrier waves corresponding to all the other overlapped frequency bands.

2. A system according to claim 1 comprising a plurality of alternative channels two of which occupy adjacent relatively wide frequency bands.

3. A system according to claim 1 comprising a plurality of alternative channels two of which occupy relatively wide frequency bands which are spaced apart by at least the width of one of the relatively narrow frequency bands.

4. A system according to claim 1 in which an alternative channel occupies a frequency band of width corresponding to three of the adjacent relatively narrow bands.

5. A system according to claim 1 in which the narrow band and broad band terminal equipment are both coupled to the transmission through a combining equipment which includes one or more hybrid coil networks.

ALFRED MARCUS THORNTON.
HECTOR THOMAS PRIOR.
STANLEY JAMES GOULLEE.

REFERENCES CITED

The following references are of record in the file of this patent:

UNITED STATES PATENTS

| Number | Name | Date |
|---|---|---|
| 1,835,031 | Espenschied et al. | Dec. 8, 1931 |
| 2,009,438 | Dudley | July 30, 1935 |
| 2,072,527 | Nicholson | Mar. 2, 1937 |
| 2,161,884 | Walter | June 13, 1939 |

OTHER REFERENCES

Bell Laboratory Record, Sept. 1948, pages 377–382.